United States Patent
Zeng et al.

(10) Patent No.: US 8,054,585 B2
(45) Date of Patent: Nov. 8, 2011

(54) GIMBAL WITH ASSYMMETRIC DYNAMIC STIFFNESS

(75) Inventors: Qinghua Zeng, Fremont, CA (US); Yen Fu, San Jose, CA (US); Ellis Cha, San Ramon, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 780 days.

(21) Appl. No.: 11/564,251

(22) Filed: Nov. 28, 2006

(65) Prior Publication Data

US 2008/0123221 A1    May 29, 2008

(51) Int. Cl.
*G11B 5/60* (2006.01)
(52) U.S. Cl. .................................... 360/245.3
(58) Field of Classification Search ............... 360/245.3, 360/245.5, 245.6, 245.8, 245.9
See application file for complete search history.

(56) References Cited

U.S. PATENT DOCUMENTS

| | | | | |
|---|---|---|---|---|
| 5,383,073 A * | 1/1995 | Masukawa et al. | ........ | 360/245.3 |
| 5,781,378 A * | 7/1998 | Heitkamp et al. | ......... | 360/245.3 |
| 6,373,662 B1 * | 4/2002 | Blaeser et al. | ............. | 360/245.5 |
| 6,522,505 B1 * | 2/2003 | Ohwe et al. | ................. | 360/245.5 |
| 6,560,074 B2 | 5/2003 | Gillis et al. | | |
| 2002/0093767 A1 * | 7/2002 | Gillis et al. | ................. | 360/245.7 |
| 2006/0132979 A1 * | 6/2006 | Horie et al. | ................. | 360/245.7 |
| 2006/0227464 A1 | 10/2006 | Huang et al. | | |
| 2006/0232889 A1 * | 10/2006 | Shum | ......................... | 360/244.9 |
| 2007/0086115 A1 * | 4/2007 | Harris et al. | ................ | 360/245.3 |

OTHER PUBLICATIONS

Translation of China Office Action—200710196706.X, Aug. 3, 2010, SAE Magnetics (H.K.) LTD.

* cited by examiner

*Primary Examiner* — Jefferson Evans

(74) *Attorney, Agent, or Firm* — Saile Ackerman LLC; Stephen B. Ackerman; Rosemary L. S. Pike

(57) ABSTRACT

In a suspension in a hard disk drive, a gimbal with asymmetric dynamic properties, in which the two halves of the gimbal may have different stiffness distribution or inertia distribution. Structural difference between the two halves, or materials with different stiffness, may cause the different stiffness distribution or inertia distribution. When the suspension vibrates, the different stiffness and/or inertia distribution increase the friction between the gimbal and a load beam of the suspension, and increase the damping of the suspension.

27 Claims, 9 Drawing Sheets

GIMBAL WITH ASSYMMETRIC DYNAMIC STIFFNESS

BACKGROUND OF THE INVENTION

A. Field of the Invention

The present invention relates to hard disk drives. More specifically, the present invention relates to improving dynamic properties of a gimbal in a hard disk drive.

B. Description of Related Art

In hard disk drives (HDD), reading and writing of the information on a disk is accomplished by a transducer on a slider mounted on a suspension. The suspension itself can have a number of components, including a load beam, a gimbal, circuit traces, hinges and a base plate. The suspension supports the transducer mechanically, and connects the transducer and a pre-amplifier electrically.

FIG. 1A illustrates a typical HDD 100, including at least one disk 110, which a spindle motor can cause to rotate around the axle of a central drive hub 120. A read/write transducer or head 130 is attached to a load beam 140 of a suspension via a slider and a gimbal, as shown in more detail in FIG. 1B. The load beam 140 is supported by an actuator arm 150 of an actuator 160. In operation, the disk 110 rotates at high speed, creating an air bearing which causes the head 130 to float over the disk surface. The actuator 160 moves the head 130 across the tracks on the disk until the head is positioned at a target track.

FIG. 1B illustrates the actuator arm 150 in more detail. As shown, the read/write head 130 is mounted on a slider 142. The slider 142 is coupled to the load beam 140 through a gimbal 143. The head 130 is held in a close relative position over data tracks formed on the disk 110 to permit a read or write operation. Because of the flexibility of the gimbal 143, the slider 142 can remain flexible while floating over the disk 110.

The high speed rotation of the disk 110 generates air flow, which cooperates with an air bearing surface (ABS) of the slider 142 to enable the slider to fly above the disk 110. The slider 142 should fly as close to the surface of the disk 110 as possible without contacting the disk. The spacing between the disk and the slider is known as the "flying height," and may be about 10 nm in some HDD.

FIGS. 2A, 2B, 2C and 2D illustrate known gimbals in more detail. As shown, the gimbal 143 has three layers: a stainless steel layer 210, a polymer layer 220, and copper circuit traces 230 on the polymer layer. The gimbal 143 is attached to the load beam 140. As shown in FIG. 2C, a dimple 240 may protrude from the back of the load beam and contact a flexure tongue on the stainless steel layer 210 of the gimbal. The center of the dimple 240 is at the center of an XYZ coordinate shown in FIG. 2A. The slider 142 is attached to the gimbal 143 via an epoxy layer 250.

In order to make the slider 142 fly stably and reliably with a small gap between the slider and the disk, suspension design has included a number of requirements, such as vertical stiffness ($K_z$), gimbal pitch and roll stiffness ($K_p$, $K_r$), gimbal static attitude—including pitch and roll static attitude (PSA/RSA), among others. These requirements are mainly static and geometrically based. Another important requirement is that the suspension has no or little dynamic effect on the slider air bearing.

A dynamic effect could be the result of head-disk contact. Another cause of a dynamic effect could be operation at high altitudes, where the air is thinner because there is less air under the slider, causing the flying height to be lower. Under these circumstances, the suspension and the slider both can be set into motion, causing dynamic effects.

Suspension dynamic performance is important in some situations. For instance, it is an important factor affecting what may be called the take-off altitude of a slider in a hard disk drive. For example, to pass a qualification test, a slider must be able to fly over a disk normally to access data on the disk when the HDD is not higher than 10,000 feet (which would mean that the take-off altitude of the HDD is 10,000 feet). At higher altitudes, the slider flies with a lower flying height and/or lower pitch angle. If the slider is disturbed by a shock or a particle, it can contact the disk and vibrate. Below the take-off altitude, the vibration of the slider will dampen, and the slider will settle down and resume normal operation. Above the take-off altitude, the slider will keep bouncing vibration, potentially preventing take off and causing an HDD failure.

The bouncing vibration (resulting from the head hitting the disk surface) is a self-excited vibration. Sufficient damping weakens vibration. If the energy that the slider obtains from the disk is greater than the energy loss due to damping, the vibration will not dampen sufficiently and the drive will fail. A high damping can prevent a sustained vibration. The damping of the suspension comes mainly from material, the friction between the gimbal and the load beam, and the friction between the dimple and the flexure tongue.

The amount of friction depends on the mode shapes of the suspension and the gimbal. Current suspension gimbals have symmetric dynamic properties. Although the copper traces of the gimbal shown in FIG. 2B appear not to be symmetric, the mode shapes of the gimbal are symmetric about the axis of the gimbal, as shown in FIG. 2D, and the dynamic properties of the gimbal are symmetric. This is because the main structure of the gimbal—the stainless steel layer of the gimbal shown in FIG. 2B—is symmetric. A symmetric suspension and gimbal will tend to have smaller amounts of friction, and thus will tend to provide lower damping. With such structure, there is a good chance that when a vibration occurs, it will not dampen, even at a relatively low altitude. A hard disk drive with the gimbal shown in FIG. 2A has a sustained vibration at 54 kHz, which makes the slider take off at 9500 feet, lower than the 10,000 feet required by the qualification test.

It is therefore desirable to have a gimbal, suspension and hard disk drive with improved dynamic properties.

DETAILED DESCRIPTION

Figure 1:
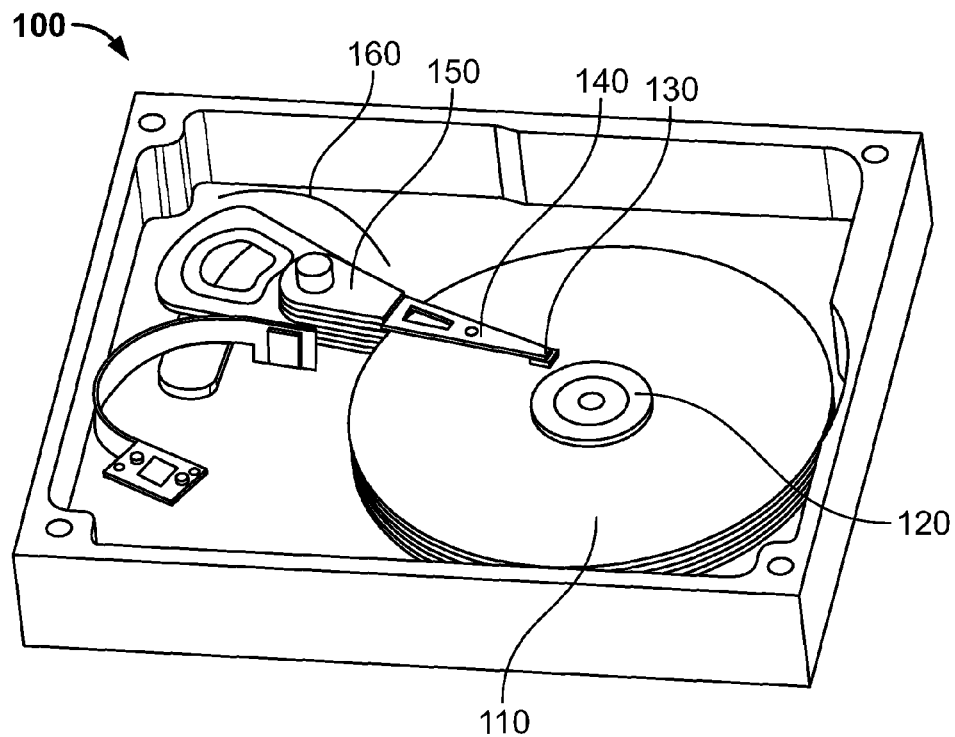
FIG. 1A illustrates a hard disk drive typical in the art.
FIG. 1B illustrates the actuator arm shown in FIG. 1A.
Figure 1B:
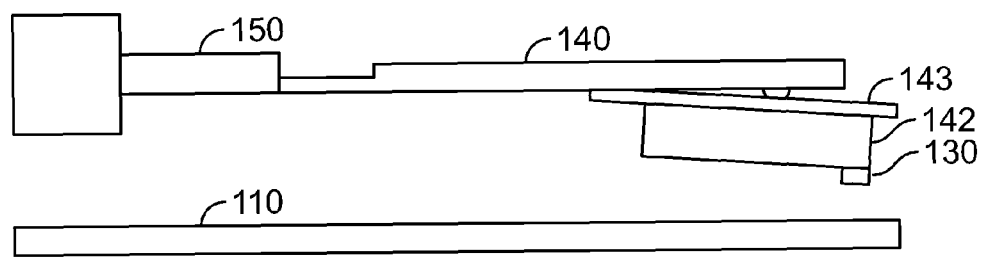
Figure 2A:
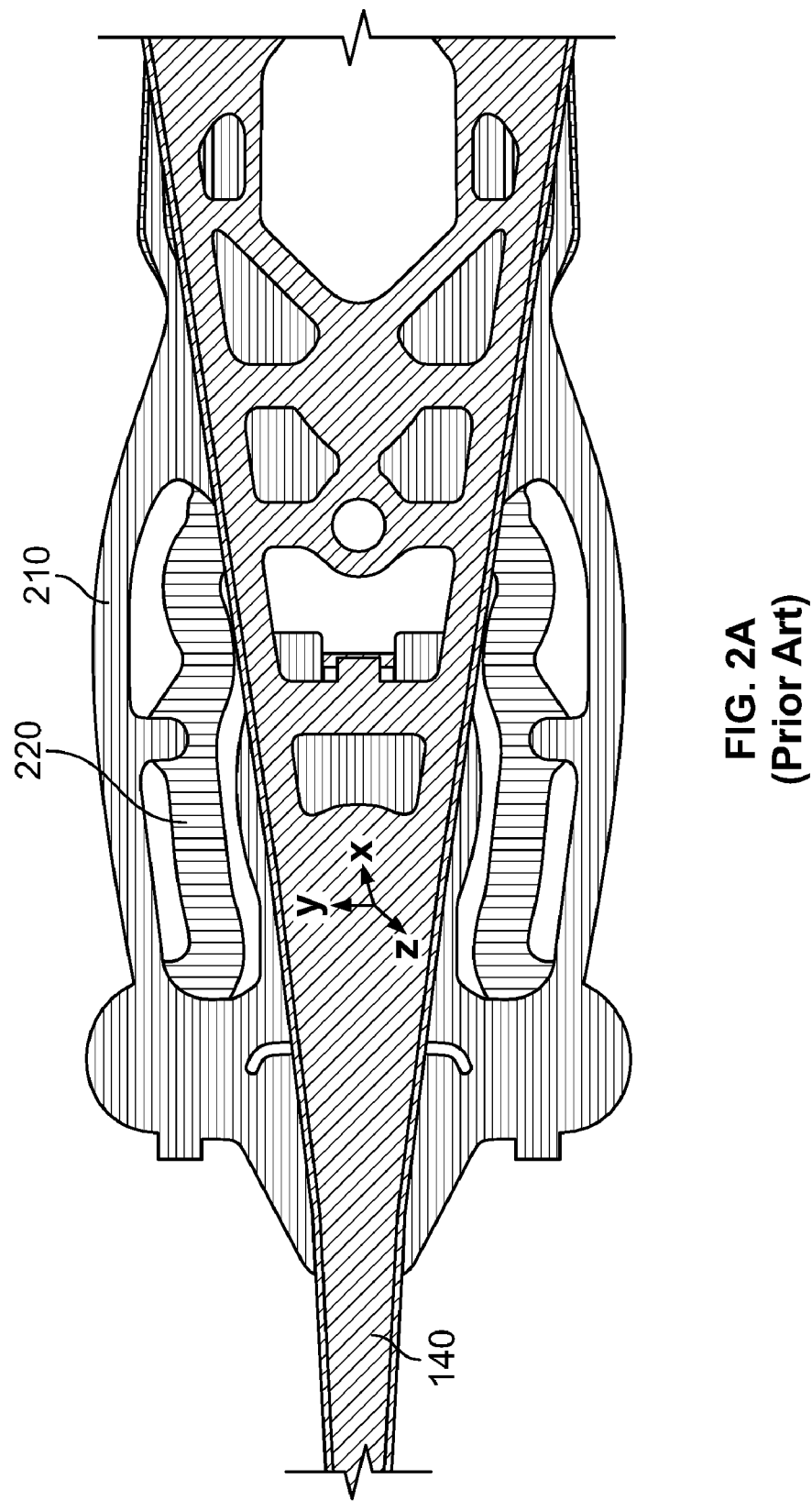
FIGS. 2A, 2B, 2C and 2D illustrate known gimbals.
Figure 2B:
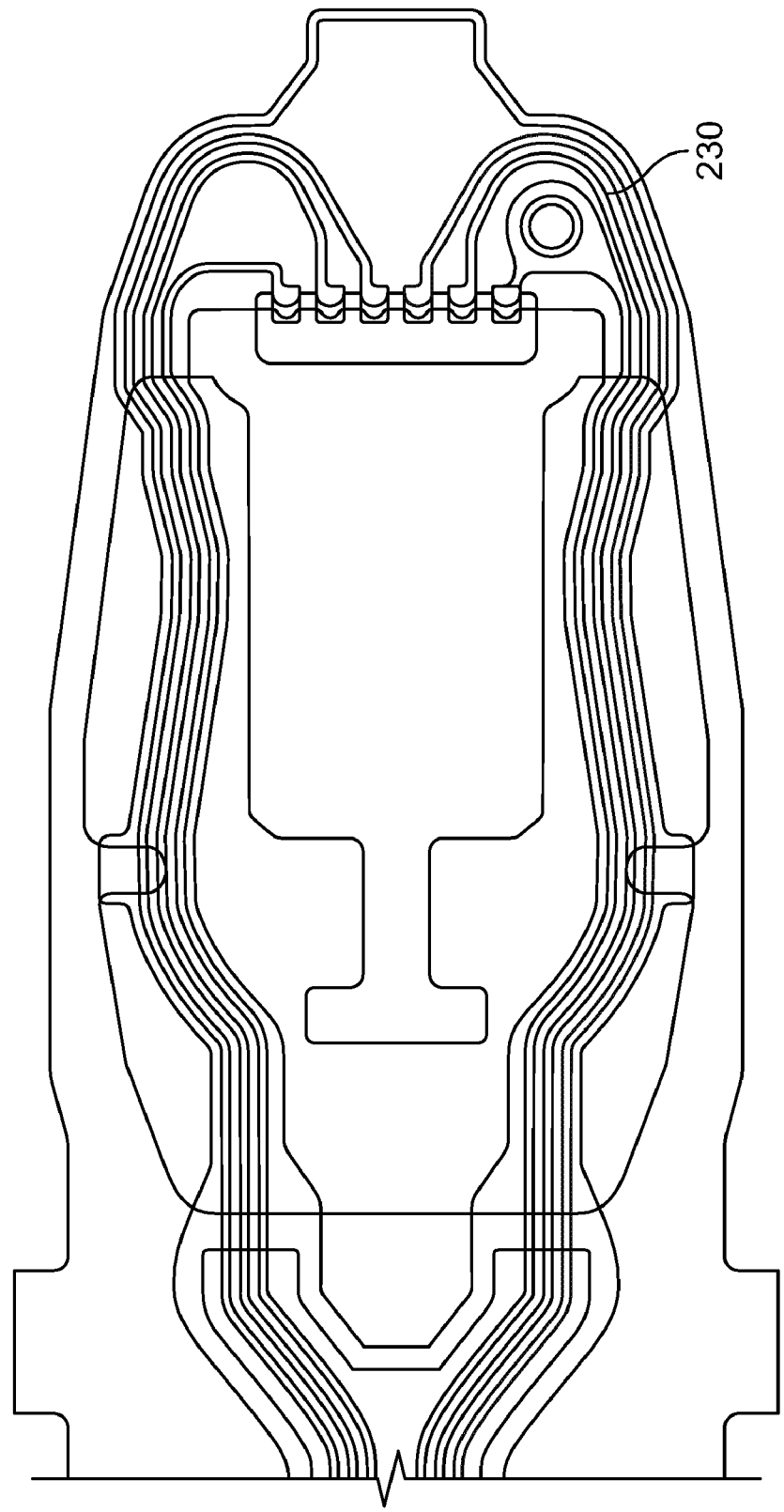
Figure 2C:
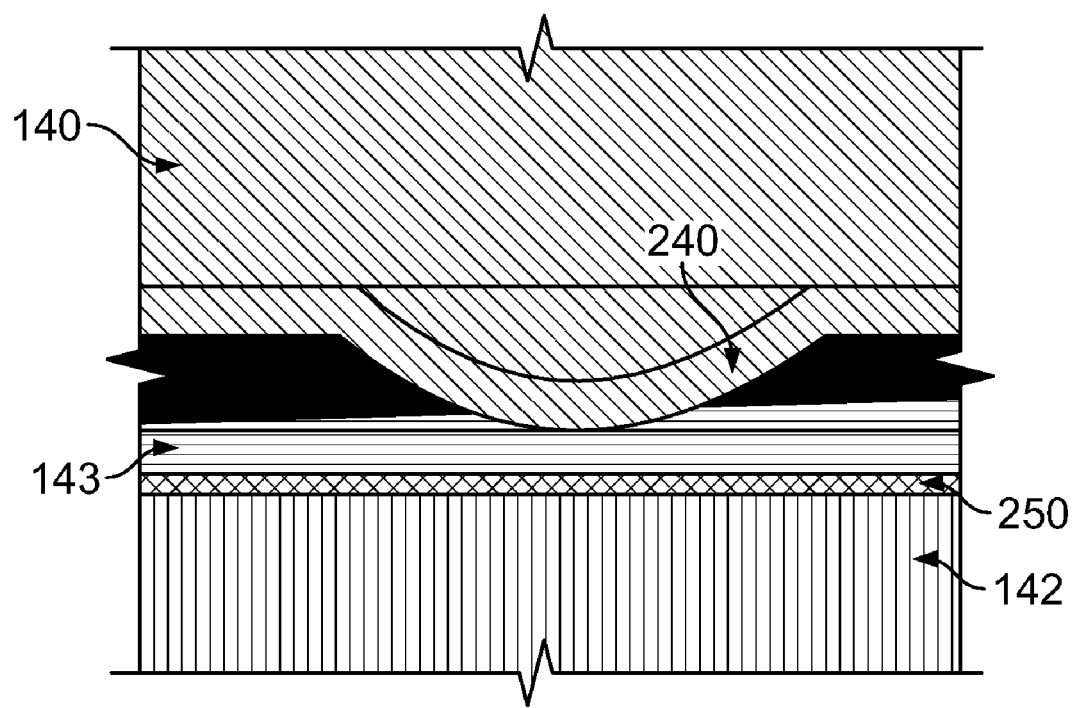
Figure 2D:
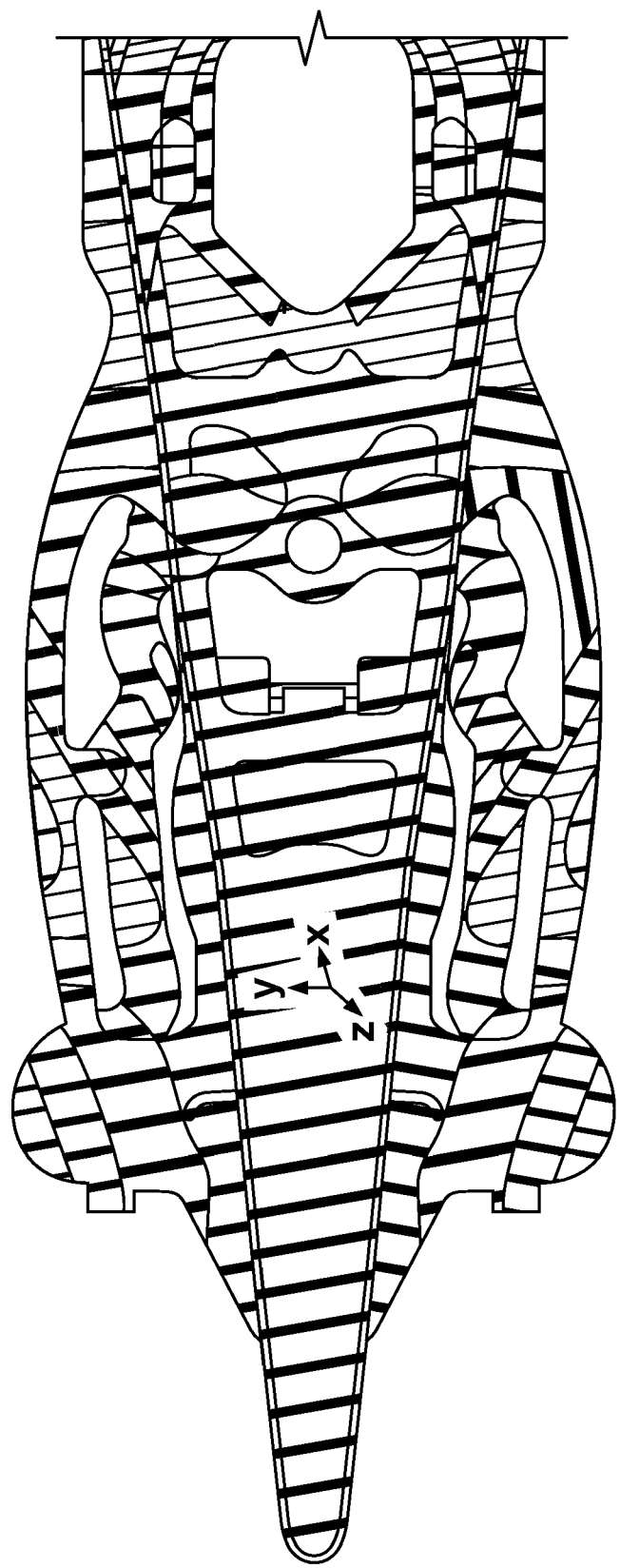
Figure 3A:
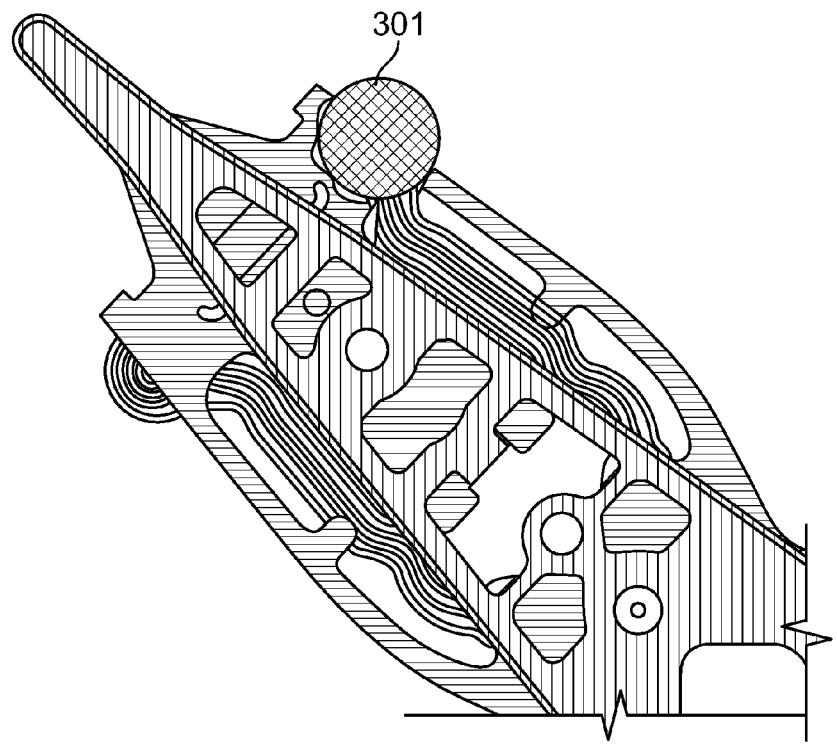
FIGS. 3A, 3B and 3C illustrate a gimbal with asymmetric dynamic properties according to one embodiment of the present invention.

FIG. 3A illustrates a gimbal with asymmetric dynamic properties according to one embodiment of the present invention. The gimbal in FIG. 3A differs from the gimbal in FIG. 2A, by having a drop of epoxy added on one side of the gimbal at 301. It makes the part of gimbal underneath stronger. The different stiffness distribution, and/or inertia distribution, of the two halves of the gimbal causes the dynamic properties of the two halves to be asymmetric.

It should be understood that other materials could be used as the additional material. In addition, the add-on material could be secured to the gimbal in a number of known ways, including by glue or epoxy.

Figure 3B:
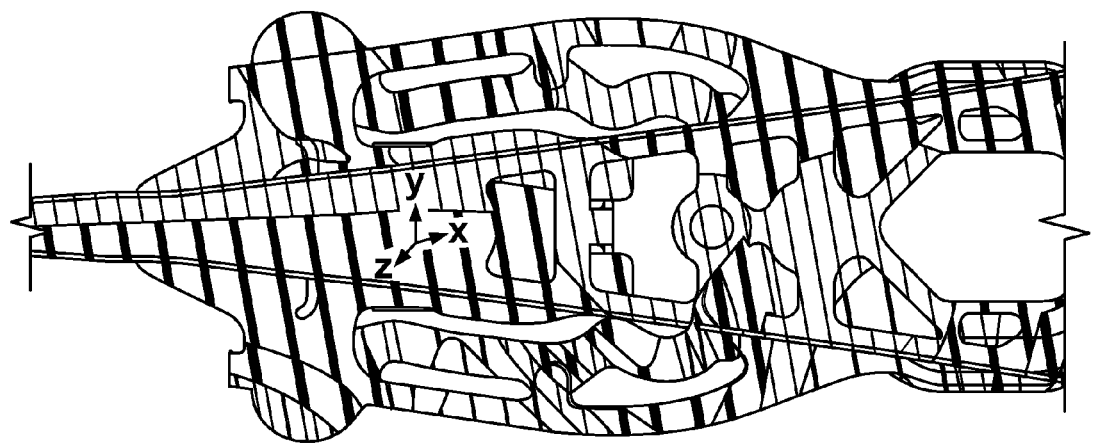

FIG. 3B illustrates a mode shape of the gimbal of FIG. 3A vibrating in a high frequency range (20-200 kHz), which is no longer symmetric about the axis of the gimbal. The asymmetric mode shapes cause larger relative motion between the load beam 140 and the gimbal 143 at the dimple 240, thus increasing the damping of the suspension. Also, the friction between the load beam 140 and the gimbal 143, and the friction between the dimple 240 and the flexure tongue of the stainless steel layer of the gimbal would be higher for many modes. In particular, the friction at the dimple 240 would consume more energy for many modes when there are strong interference forces on the slider. The high damping makes sustained vibration less likely, and increases the take-off altitude of the suspension. The take-off altitude of a suspension with the gimbal shown in FIG. 3A is about 14,000 feet, considerably higher than the 9,500 feet take-off altitude of a suspension with the gimbal shown in FIG. 2A.

Figure 3C:
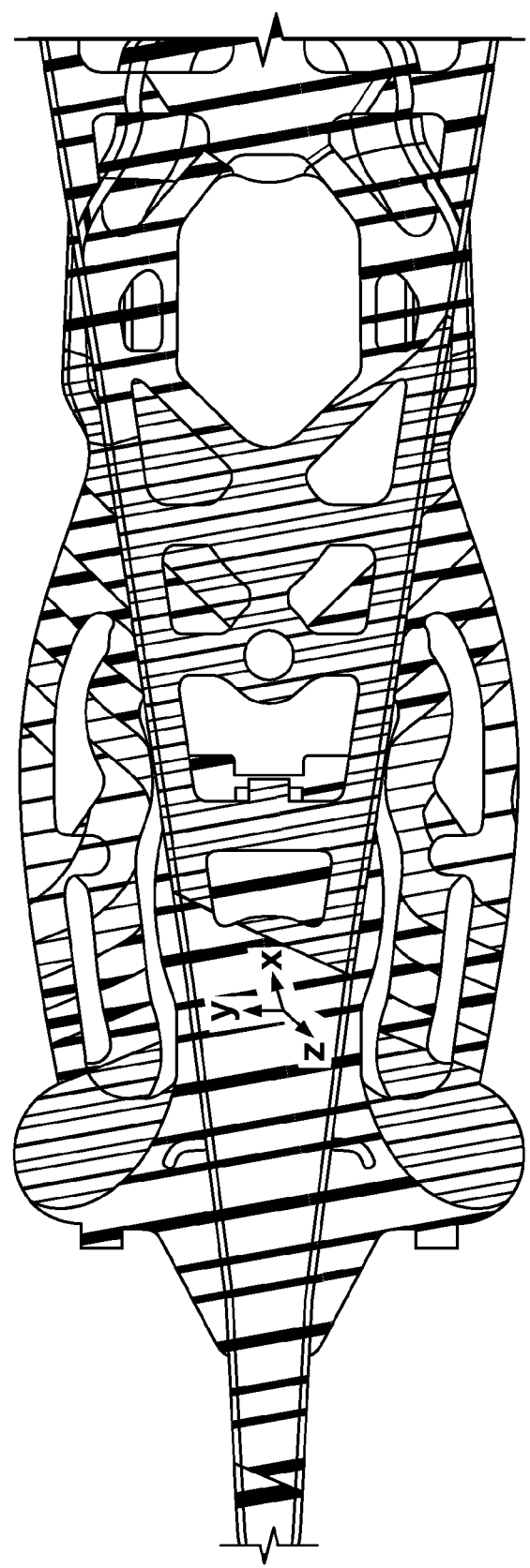

FIG. 3C illustrates a mode shape of the gimbal of FIG. 3A vibrating in a low frequency range (0-20 kHz). Symmetric dynamic properties in the low frequency range are important for servo performance of the suspension. As shown, the asymmetric gimbal of FIG. 3A has almost perfect symmetric dynamic properties in the low frequency range, and thus does not negatively affect the servo. This is another advantage of the gimbal with asymmetric dynamic properties of the present invention. The gimbal of the present invention looks symmetric overall, so it has almost symmetric dynamic properties in the low frequency range (0~20 kHz). At the same time, the gimbal looks asymmetric locally, so it has asymmetric dynamic properties in the high frequency range (20~200 kHz).

There are many other ways to make the dynamic properties of a gimbal asymmetric. FIGS. 4A, 4B, 4C and 4D illustrate gimbals with asymmetric dynamic properties according to additional embodiments of the present invention. In these gimbals, the two halves of the stainless steel layer are asymmetric. Additional stainless steel is used in the upper half of the gimbal, as shown at shadow areas 401, 403, and 404. Or, the stainless steel portion may be at different locations, as shown for example in shadow areas 402.

Figure 4A:
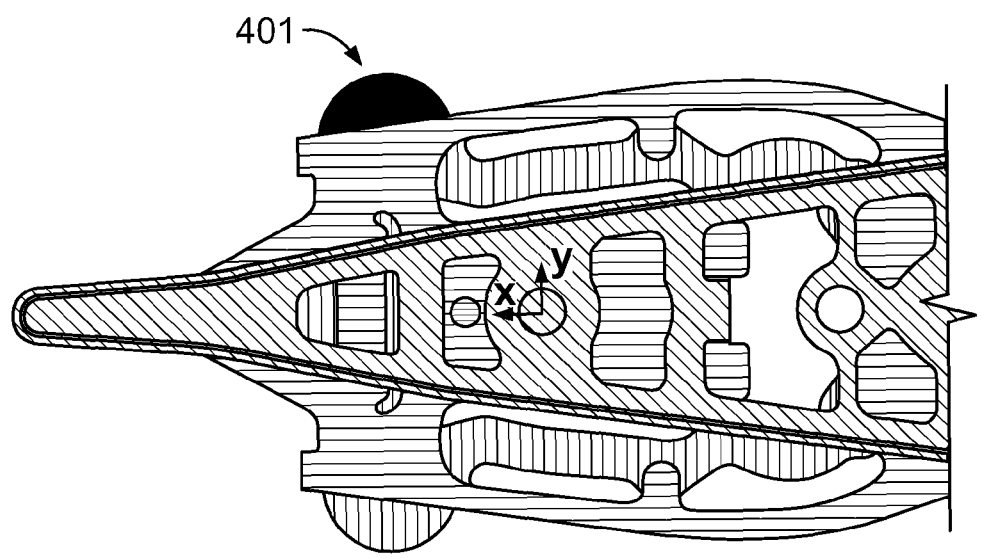
FIGS. 4A, 4B, 4C and 4D illustrate gimbals with asymmetric dynamic properties according to additional embodiments of the present invention.
Figure 4B:
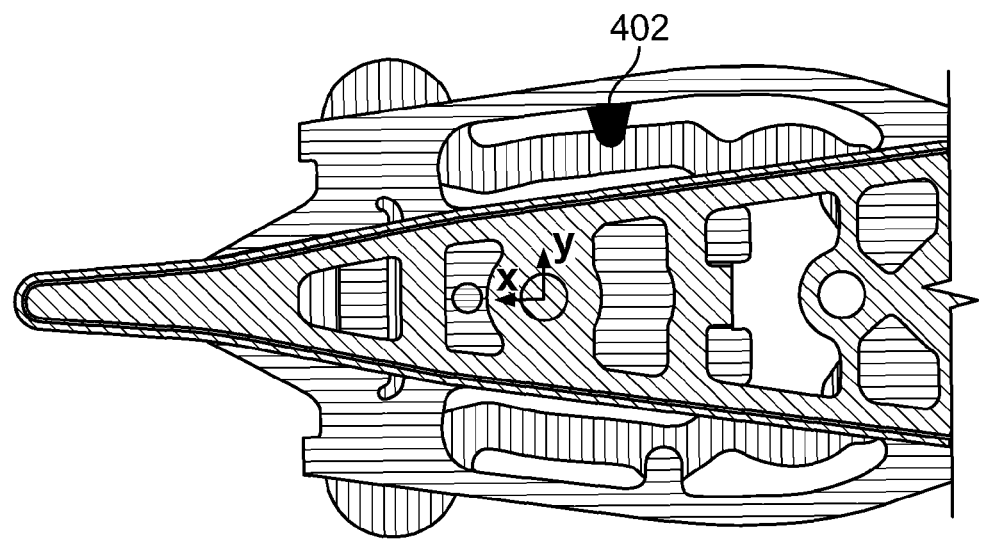

Specifically, in FIG. 4A, additional stainless steel is provided on the polymer layer of the gimbal. The additional stainless steel could be designed in the layout of the stainless steel layer. Alternatively, if the layout of the stainless steel is symmetric, the additional stainless steel material could be glued on the polymer layer.

Figure 4C:
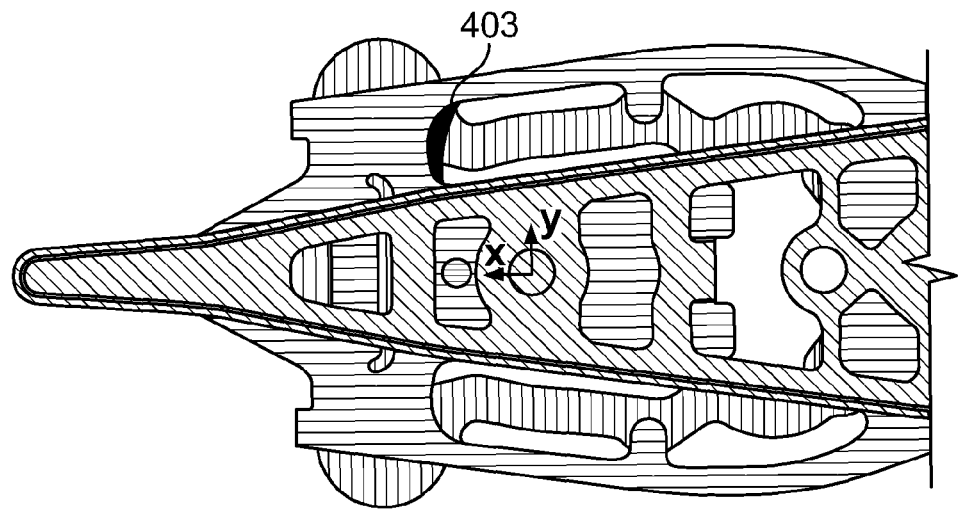
Figure 4D:
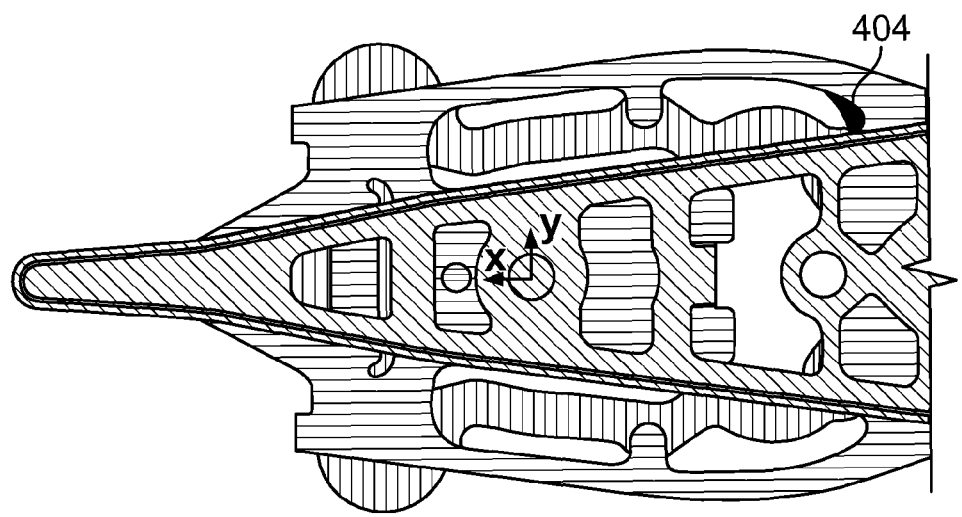

In FIGS. 4A, 4C and 4D, the gimbals become asymmetric because of additional stainless steel 401, 403, and 404. The additional stainless steel 401, 403, and 404 could be designed in the layout of the stainless steel layer, or added on later. In contrast, in FIG. 4B, the upper half and lower half of the gimbal have different shapes because of the location of the stainless steel 402 designed in the layout of the stainless steel layer. It should be understood that there could be other types of designed-in layout difference, e.g., providing gimbal legs with different widths. The asymmetric design of the stainless steel layer will cause the upper half and lower half of the gimbal to have different stiffness distribution or inertia distribution, and consequently, asymmetric dynamic properties.

It should be understood that there are other ways to make the upper half and lower half of the gimbal to have different stiffness distributions, and thus asymmetric dynamic properties. For example, the upper and lower halves could be made using materials having different respective stiffnesses.

While the present invention has been described with reference to the aforementioned applications, this description of the embodiments is not meant to be construed in a limiting sense. It shall be understood that all aspects of the present invention are not limited to the specific depictions, configurations or dimensions set forth herein which depend upon a variety of principles and variables. Various modifications in form and detail of the disclosed apparatus, as well as other variations of the present invention, will be apparent to a person skilled in the art upon reference to the present disclosure. It is therefore contemplated that the appended claims shall cover any such modifications or variations of the described embodiments as falling within the true spirit and scope of the present invention.

The invention claimed is:

1. A gimbal for attaching a slider to a load beam, comprising:
   a stainless steel layer;
   a polymer layer applied on the stainless steel layer; and
   copper circuit traces on the polymer layer,
   wherein the gimbal has first and second halves, relative to a physical longitudinal axis thereof, wherein either the first half or the second half has additional stainless steel material provided thereon so that the gimbal has asymmetric stiffness wherein the stainless steel is secured to the polymer layer by glue or is secured to the stainless steel layer by glue or epoxy or the like.

2. The gimbal of claim 1, wherein a layout of stainless steel on the first and second halves, respectively, is different.

3. The gimbal of claim 1, wherein the two halves have different inertia distribution.

4. A suspension comprising:
   a slider;
   a load beam having a dimple protruding therefrom; and
   a gimbal for attaching the slider to the load beam, said gimbal comprising:
      a stainless steel layer;
      a flexure tongue on the stainless steel layer;
      a polymer layer applied on the stainless steel layer; and
      copper circuit traces on the polymer layer,
   wherein the dimple on said load beam contacts the flexure tongue; and
   wherein the gimbal comprises first and second halves, relative to a physical longitudinal axis thereof, with different respective stiffness distributions so that the gimbal has asymmetric stiffness.

5. A head gimbal assembly comprising:
   a slider;
   a transducer mounted on the slider; and
   a gimbal for attaching said slider to a load beam, comprising:
      a stainless steel layer;
      a polymer layer applied on the stainless steel layer; and
      copper circuit traces on the polymer layer,
   wherein the gimbal has first and second halves, relative to a physical longitudinal axis thereof, wherein either the first half or the second half has additional stainless steel material provided thereon so that the gimbal has asymmetric stiffness wherein the stainless steel is secured to the polymer layer by glue or is secured to the stainless steel layer by glue or epoxy or the like.

6. A suspension comprising:
   a load beam; and
   a gimbal for attaching a slider to said load beam, comprising:

a stainless steel layer;
a polymer layer applied on the stainless steel layer; and
copper circuit traces on the polymer layer,
wherein the gimbal has first and second halves, relative to a physical longitudinal axis thereof, wherein either the first half or the second half has additional stainless steel material provided thereon so that the gimbal has asymmetric stiffness wherein the stainless steel is secured to the polymer layer by glue or is secured to the stainless steel layer by glue or epoxy or the like.

7. A hard disk drive comprising:
at least one disk rotatable by a spindle motor around an axle of a central drive hub;
an actuator including at least one actuator arm;
a load beam attached to the at least one actuator arm;
a slider attached to the load beam by a gimbal, said gimbal comprising:
a stainless steel layer;
a polymer layer applied on the stainless steel layer; and
copper circuit traces on the polymer layer,
wherein the gimbal has first and second halves, relative to a physical longitudinal axis thereof, wherein either the first half or the second half has additional stainless steel material provided thereon so that the gimbal has asymmetric stiffness wherein the stainless steel is secured to the polymer layer by glue or is secured to the stainless steel layer by glue or epoxy or the like; and
a transducer mounted on the slider.

8. The hard disk drive of claim 7 wherein said hard disk drive is a component in an electronic device.

9. A head gimbal assembly comprising:
a slider;
a transducer mounted on the slider;
a load beam having a dimple protruding therefrom; and
a gimbal for attaching the slider to the load beam, said gimbal comprising:
a stainless steel layer;
a flexure tongue on the stainless steel layer;
a polymer layer applied on the stainless steel layer; and
copper circuit traces on the polymer layer,
wherein the dimple on said load beam contacts the flexure tongue; and
wherein the gimbal has first and second halves, relative to a physical longitudinal axis thereof, with a structural difference therebetween so that the gimbal has asymmetric stiffness.

10. The head gimbal assembly of claim 9, wherein a layout of stainless steel on the first and second halves, respectively, is different.

11. The head gimbal assembly of claim 9, wherein either the first half or the second half has additional material provided thereon.

12. The head gimbal assembly of claim 11, wherein the additional material comprises stainless steel.

13. The head gimbal assembly of claim 12, wherein the stainless steel is part of the stainless steel layer.

14. The head gimbal assembly of claim 12, wherein the stainless steel is secured to the stainless steel layer by glue or epoxy.

15. The head gimbal assembly of claim 12, wherein the stainless steel is secured to the polymer layer by glue.

16. The head gimbal assembly of claim 9, wherein the two halves have different inertia distribution.

17. A hard disk drive comprising:
at least one disk rotatable by a spindle motor around an axle of a central drive hub;
an actuator including at least one actuator arm; and
a head gimbal assembly comprising:
a slider;
a transducer mounted on the slider;
a load beam having a dimple protruding therefrom; and
a gimbal for attaching the slider to the load beam, said gimbal comprising:
a stainless steel layer;
a flexure tongue on the stainless steel layer;
a polymer layer applied on the stainless steel layer; and
copper circuit traces on the polymer layer,
wherein the dimple on said load beam contacts the flexure tongue; and
wherein the gimbal has first and second halves, relative to a physical longitudinal axis thereof, with a structural difference therebetween so that the gimbal has asymmetric stiffness wherein the load beam is attached to the at least one actuator arm.

18. The hard disk drive of claim 17 wherein said hard disk drive is a component in an electronic device.

19. The suspension of claim 4, wherein a layout of stainless steel on the first and second halves, respectively, is different.

20. The suspension of claim 4, wherein either the first half or the second half has additional material provided thereon.

21. The suspension of claim 20, wherein the additional material comprises stainless steel.

22. The suspension of claim 21, wherein the stainless steel is part of the stainless steel layer.

23. The suspension of claim 21, wherein the stainless steel is secured to the stainless steel layer by glue or epoxy.

24. The suspension of claim 21, wherein the stainless steel is secured to the polymer layer by glue.

25. The suspension of claim 4, wherein the two halves have different inertia distribution.

26. A hard disk drive comprising:
at least one disk rotatable by a spindle motor around an axle of a central drive hub;
an actuator including at least one actuator arm; and
a suspension comprising:
a slider;
a load beam having a dimple protruding therefrom; and
a gimbal for attaching the slider to the load beam, said gimbal comprising:
a stainless steel layer;
a flexure tongue on the stainless steel layer;
a polymer layer applied on the stainless steel layer; and
copper circuit traces on the polymer layer,
wherein the dimple on said load beam contacts the flexure tongue; and
wherein the gimbal comprises first and second halves, relative to a physical longitudinal axis thereof, with different respective stiffness distributions so that the gimbal has asymmetric stiffness wherein the load beam is attached to the at least one actuator arm.

27. The hard disk drive of claim 26 wherein said hard disk drive is a component in an electronic device.

* * * * *

UNITED STATES PATENT AND TRADEMARK OFFICE
CERTIFICATE OF CORRECTION

| | |
|---|---|
| PATENT NO. | : 8,054,585 B2 |
| APPLICATION NO. | : 11/564251 |
| DATED | : November 8, 2011 |
| INVENTOR(S) | : Qinghua Zeng, Yen Fu and Ellis Cha |

It is certified that error appears in the above-identified patent and that said Letters Patent is hereby corrected as shown below:

In the Title (54) and Col. 1, lines 1-2; delete "Gimbal With Assymmetric Dynamic Stiffness" and replace with -- Gimbal With Asymmetric Dynamic Properties --.

Signed and Sealed this
Seventeenth Day of April, 2012

David J. Kappos
*Director of the United States Patent and Trademark Office*